United States Patent [19]
Horvath

[11] 3,852,997
[45] Dec. 10, 1974

[54] METHOD AND APPARATUS FOR MONITORING POLLUTION OF NATURAL WATERS

[75] Inventor: Robert Horvath, Plymouth, Mich.

[73] Assignee: Environmental Research Institute of Michigan, Ann Arbor, Mich.

[22] Filed: Feb. 9, 1973

[21] Appl. No.: 331,300

[52] U.S. Cl. ............................ 73/61.1 R, 73/61.3
[51] Int. Cl. .......................................... G01n 25/00
[58] Field of Search ....... 73/53, 61 R, 61.1 R, 15 R, 73/25, 77, 338, 61.3

[56] References Cited
UNITED STATES PATENTS

| | | | |
|---|---|---|---|
| 2,845,790 | 8/1958 | Eddy | 73/338 X |
| 3,264,862 | 8/1966 | Felton et al. | 73/61.1 R UX |
| 3,449,942 | 6/1969 | Simon | 73/53 |

*Primary Examiner*—Richard C. Queisser
*Assistant Examiner*—Joseph W. Roskos
*Attorney, Agent, or Firm*—Snyder, Brown and Ramik

[57] ABSTRACT

Wet bulb temperature readings are used to determine the presence of pollutants which differ significantly in evaporative rate from that of the natural water which they pollute. Liquid from a portion of the natural water which may become polluted is used to wet one temperature sensor while natural water which cannot simultaneously be polluted is used to wet another temperature sensor. The wet bulb temperatures of the two sensors are compared to determine the presence of pollutant.

14 Claims, 2 Drawing Figures

PATENTED DEC 10 1974

3,852,997

METHOD AND APPARATUS FOR MONITORING POLLUTION OF NATURAL WATERS

BACKGROUND OF THE INVENTION

Aside from direct physical observation, various techniques have been proposed for detecting the presence of pollutants in natural waters as, for example, by detecting directly or indirectly a change in one or more of the optical characteristics of the natural water or by physically sampling and chemically analyzing the natural water. Such techniques, although effective, necessitate rather involved and complicated structure to carry out the requisite detecting and they are subject to various disadvantages of a practical nature.

Accordingly, it would be dsirable to provide a simple, inexpensive and wholly reliable technique for detecting the presence of pollutants in natural waters.

BRIEF SUMMARY OF THE INVENTION

Briefly stated, the present invention is directed to a method and apparatus which utilizes means for detecting the difference in evaporative rates of two different liquids, one of which liquids is the natural water itself and the other of which is the polluted natural water. These evaporative rates are determined at or substantially at ambient temperature and means is provided for comparing any difference in these evaporative rates to indicate the presence of pollutants.

BRIEF DESCRIPTION OF THE DRAWING FIGURES

DETAILED DESCRIPTION OF THE INVENTION

Figure 1:
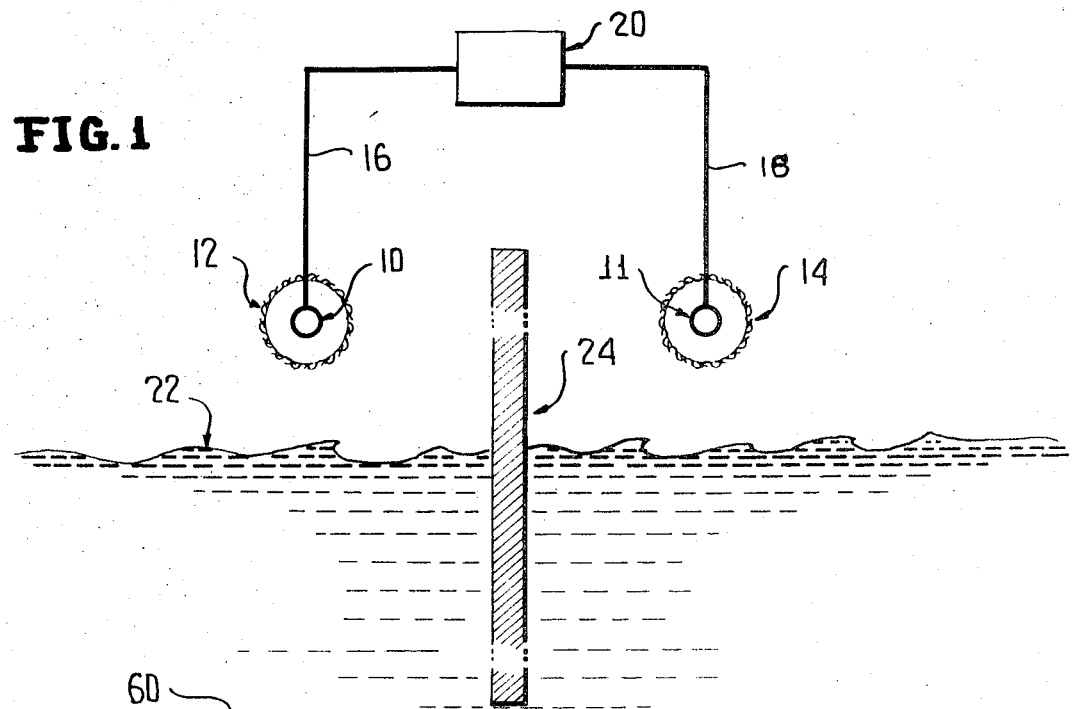
FIG. 1 is a view diagrammatically illustrating principles of the invention.

In FIG. 1, there is shown a pair of temperature sensors 10 and 11 each provided with covering means of wettable material as indicated by reference characters 12 and 14 and these individual temperature sensors are connected as indicated at 16 and 18 to comparator means 20 which gives a read-out of the difference in temperatures indicated by the two sensors 10 and 11.

In the illustrative embodiment of FIG. 1, the body of natural water is indicated generally by the reference character 22 and there is provided a barrier or dike 24 which projects sufficiently above and below the surface of the liquid effectively to isolate the portions to the left and right of the barrier means 24.

In operation, the two sensors are lowered so that their covering means 12 and 14 are wetted by the respective liquids on the left and right of the barrier 24 and then they are again elevated so that the natural rate of evaporative cooling effected by the wetted covering means 12 and 14 will cause corresponding temperature readings at the sensors 10 and 11. These readings are compared by the means 20 and any difference indicative of the encroachment of a pollutant, say, in the body of natural water to the left of the barrier 24 may be used to sound or record an alarm, or to effect any other indication as may be desired. The system is particularly well suited although it is to be understood it is not limited to the detection of oil slicks or the presence of oil like material floating on the surface of the natural water. When the body of water to the right of the barrier means 24 and which is protected from the encroachment of such a pollutant, is compared in wet bulb temperature with respect to the body of water to the left of the barrier means 24 which has been encroached with oil, the substantially slower rate of evaporation of the liquid picked up by the covering means 12 as compared with the evaporative rate of the natural water itself which has been picked up by the covering means 14 will result in a substantial temperature difference indicated by the sensors 10 and 11.

These sensors may take any convenient form as for example they may be of electrical form in character or they may be of mechanical configuration and, likewise, the comparing means 20 will take the requisite form as dictated by the construction of the sensors 10 and 11. Likewise, any means for continuously or intermittently wetting the covering means 12 and 14 may be employed. Further, the utilization of barrier means 24 is not essential in all cases as, for example, the temperature sensors and their covering means may be located physically sufficiently far apart that one of them will always be associated with water which will be polluted before that with which the other is associated. Alternatively, one of the sensors and its covering means may be associated with an isolated sample of the natural water, or any other means for effecting isolation between the waters associated with the respective sensors 10 and 11 may be utilized as desired.

Figure 2:
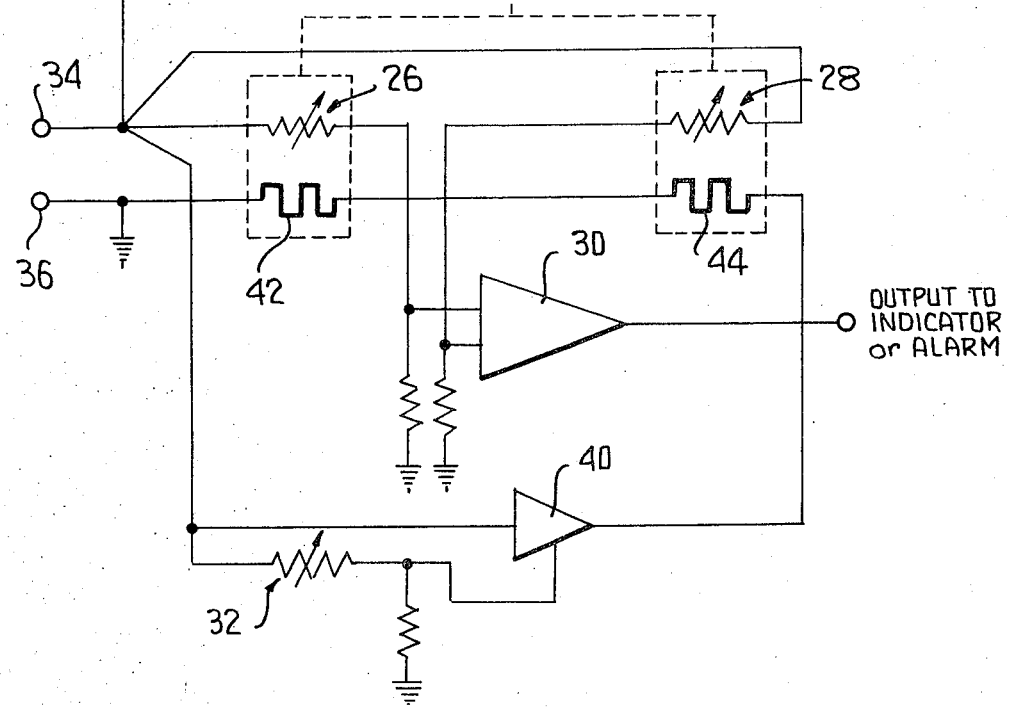
FIG. 2 is a circuit diagram showing an illustrative embodiment of the invention.

In the illustrative embodiment according to FIG. 2, the sensors 26 and 28 corresponding to the sensors 10 and 11 respectively of FIG. 1 are in the form of thermistors and the comparator means 20 of FIG. 1 takes the form of a differential amplifier 30 in FIG. 2. FIG. 2 also illustrates certain refinements in the device which it may be profitable to employ. For example, a third temperature sensor 32 also in the form of a thermistor may be employed and which, unlike the sensors 26 and 28, is not provided with a covering means and is exposed only to ambient temperature conditions. All three temperature sensors are energized from a common source as indicated by the terminals 34 and 36 and the output of the ambient temperature sensor at the conductor 38 controls a variable gain amplifier 40 which supplies heat to the two sensors 26 and 28. For the purpose of illustration, this additional heat is shown as provided by a series pair of heaters 42 and 44 associated with the respective sensors 26 and 28 and energized at the output of the variable gain amplifier 40 whose gain characteristics are so chosen that sufficient heat is applied to the two sensors 26 and 28 so that even when the apparatus is operating under conditions of high humidity, both sensors 26 and 28 will operate as if the ambient temperature were slightly higher.

FIG. 2 also illustrates in diagrammatic form one manner in which periodic immersion of the covering means 12 and 14 can be performed. As shown, a carrier 46 commonly mounts the two sensors 26 and 28 and their associated heating elements 42 and 44 periodically to dip into the liquid. For this purpose, the carrier 46 is mounted on a lever mechanism 48 pivoted at 50 to a suitable fixed pivot member and the opposite end of the lever system 48 is slot-connected to the pin 52 on a rotary cam disc 54. The disc carries a switch-camming element 56 which in the position shown normally holds the switch 58 in open condition and in parallel with this normally open switch there is provided a time switch 60 which periodically momentarily shunts the switch 58 and completes the circuit to the motor 62 which drives the disc 54. The energization by the switch 60 is sufficiently long as to allow the cam element 56 to disengage the switch 58 whereafter the switch 58 maintains the circuit to the motor 62 until one revolution of the disc 54 is effected whereupon the circuit to the motor is then opened. During this course of procedure, the carrier 46 has caused the sensors 26 and 28 to dip into the water and return to elevated position where their covering means 12 and 14 are exposed to the ambient atmosphere.

From the above, it will be manifest that the construction and the operation of the device is very simple and employs unsophisticated components and which can be implemented in an inexpensive and highly efficient manner. As noted, electrical components may be utilized throughout in which case the construction according to the invention requires little electrical power. On the other hand, mechanical sensors can also be employed so as further to decrease the power requirement and, in general, to optimize the construction efficiency, lifetime and durability and to minimize the effects of adverse environmental conditions.

What is claimed is:

1. The method of monitoring natural waters which are subject to sources of pollution in the form of surface slick, which comprises the steps of:
    a. isolating a first body of the natural water from a second body thereof such that said first body is not subject to sources of surface slick pollution to which the second body is subject;
    b. determining the evaporative rate of liquids at the surfaces of said first and second bodies of the natural water substantially at ambient temperature conditions; and
    c. comparing the evaporative rates determined in step (b).

2. The method according to claim 1 wherein step (b) is effected by wetting two separate temperature sensors with liquids from the surfaces of said first and second bodies and determining the wet bulb temperatures of such sensors.

3. The method according to claim 2 wherein steps (b) and (c) are performed periodically to effect a continuing monitor of the natural water.

4. The method according to claim 3 including the step of maintaining the environments of said sensors at a temperature slightly above ambient temperature.

5. The method of monitoring natural waters which are subject to sources of pollution in the form of surface slick, which comprises the steps of:
    a. determining the evaporative rate of liquid from the surface of a body of the natural water subject to surface slick pollution by wet bulb temperature measurement;
    b. determining the evaporative rate of liquid from the surface of water which is not subject to surface slick pollution by wet bulb temperature measurement; and
    c. comparing the evaporative rates determined in steps (a) and (b) to detect the onset of pollution of the body of water of step (a).

6. The method according to claim 5 wherein steps (a)-(c) are effected periodically to effect a continuing monitor of the natural water.

7. The method according to claim 5 wherein steps (a) and (b) are effected by wetting two separate temperature sensors.

8. The method according to claim 7 including the step of maintaining the environments of said sensors at a temperature slightly above ambient temperature.

9. Apparatus for monitoring natural waters which are subject to sources of pollution in the form of surface slick, comprising in combination:
    a first temperature sensor having wettable covering means;
    a second temperature sensor having wettable covering means;
    means for wetting the covering means of said first and second temperature sensors respectively by immersion through the surface of liquid from a portion of natural water which may become polluted and by immersion through the surface of natural water from a portion of natural water which is not polluted;
    means for determining the difference, if any, in wet bulb temperatures indicated by said first and second temperature sensors.

10. Apparatus according to claim 9 including means for periodically dipping said first and second temperature sensors into the natural water.

11. Apparatus according to claim 10 including barrier means isolating the natural water into which said first and second temperature sensors are dipped.

12. Apparatus for monitoring natural waters which are subject to sources of pollution, comprising in combination:
    a first temperature sensor having wettable covering means;
    a second temperature sensor having wettable covering means;
    means for wetting the covering means of said first and second temperature sensors respectively with liquid from a portion of natural water which may become polluted and with natural water from a portion of natural water which is not polluted;
    means for determining the difference, if any, in wet bulb temperatures indicated by said first and second temperature sensors; and
    a third temperature sensor exposed to ambient temperature; and means for maintaining temperature environment for said first and second temperature sensors which is slightly higher than ambient temperature indicated by said third temperature sensor.

13. Apparatus according to claim 12 including means for periodically dipping said first and second temperature sensors into the natural water.

14. Apparatus according to claim 13 including barrier means isolating the natural water into which said first and second temperature sensors are dipped.

* * * * *